(12) United States Patent
Huang

(10) Patent No.: US 9,664,142 B1
(45) Date of Patent: May 30, 2017

(54) ROCKET STRUCTURE

(71) Applicant: Jian-Lin Huang, Tainan (TW)

(72) Inventor: Jian-Lin Huang, Tainan (TW)

( * ) Notice: Subject to any disclaimer, the term of this patent is extended or adjusted under 35 U.S.C. 154(b) by 97 days.

(21) Appl. No.: 15/151,858

(22) Filed: May 11, 2016

(51) Int. Cl.
*F02K 9/28* (2006.01)
*F42B 15/00* (2006.01)
*F02K 9/30* (2006.01)
*F02K 9/36* (2006.01)
*F42B 15/10* (2006.01)
*F42B 30/08* (2006.01)

(52) U.S. Cl.
CPC .............. *F02K 9/28* (2013.01); *F02K 9/30* (2013.01); *F02K 9/36* (2013.01); *F42B 15/105* (2013.01); *F42B 30/08* (2013.01)

(58) Field of Classification Search
CPC .... F42B 8/24; F42B 8/12; F42B 30/08; F42B 30/10; F42B 30/12; F42B 15/00; F42B 15/105; F42B 15/36; F02K 9/28; F02K 9/30; F02K 9/36
USPC ....... 102/217, 499, 490, 443, 360, 351, 352, 102/348, 347, 345, 380, 376, 379
See application file for complete search history.

(56) References Cited

U.S. PATENT DOCUMENTS

| | | | | |
|---|---|---|---|---|
| 41,689 A | * | 2/1864 | Edge | F42B 8/24 102/348 |
| 865,282 A | * | 9/1907 | Voller | F42B 10/40 102/490 |
| 1,325,706 A | * | 12/1919 | Todisco | F42B 12/32 102/495 |
| 2,459,163 A | * | 1/1949 | Hickman | F42B 15/36 102/202 |
| 2,459,687 A | * | 1/1949 | Decker | F42B 4/02 102/342 |
| 2,548,972 A | * | 4/1951 | Grisamore | F42B 15/00 60/255 |
| 2,926,608 A | * | 3/1960 | Chandler | F42B 15/00 102/380 |
| 3,008,414 A | * | 11/1961 | Jasse | F42B 5/10 102/372 |
| 3,306,204 A | * | 2/1967 | Throner, Jr. | F02K 9/36 60/255 |
| 3,326,128 A | * | 6/1967 | Choate | F42B 5/10 102/376 |
| 3,388,666 A | * | 6/1968 | Walther | F42B 5/105 102/377 |

(Continued)

*Primary Examiner* — Derrick Morgan
(74) *Attorney, Agent, or Firm* — Rosenberg, Klein & Lee

(57) ABSTRACT

A rocket which can be propelled spirally from a rifling-free launcher tube without backblast includes a warhead, a rocket body, and a rocket motor including: an outer casing whose bottom has inclined propulsion-gas outlet holes; a first supporting member coupled to the outer casing; a first bullet on the first supporting member; a connecting member with first and second connecting portions, the first connecting portion connected to the first bullet; an inner casing in the outer casing; a second supporting member coupled to the inner casing and the second connecting portion and having a shielding portion; a metal plate in the second supporting member, with a through hole shielded by the shielding portion; an elastic member on the metal plate; a second bullet on the second supporting member, abutting against the elastic member; and a plastic cover covering the second bullet to form a gunpowder chamber in the inner casing.

8 Claims, 6 Drawing Sheets

(56) References Cited

U.S. PATENT DOCUMENTS

| | | | | |
|---|---|---|---|---|
| 3,426,683 | A * | 2/1969 | Apotheloz | F42B 4/12 102/348 |
| 3,439,613 | A * | 4/1969 | Thomanek | F42B 12/10 102/374 |
| 3,735,706 | A * | 5/1973 | Elstow | F42B 4/06 102/340 |
| 3,788,230 | A * | 1/1974 | Losfeld | F42B 10/06 102/260 |
| 3,943,854 | A * | 3/1976 | Zwicker | F42B 12/58 102/348 |
| 4,099,465 | A * | 7/1978 | Haake | F42C 15/31 102/204 |
| 4,446,794 | A * | 5/1984 | Simmons | F42B 12/70 102/334 |
| 4,493,263 | A * | 1/1985 | Carabateas | F42B 30/04 102/376 |
| 4,619,202 | A * | 10/1986 | Romer | F42B 5/02 102/443 |
| 5,029,530 | A * | 7/1991 | Martwick | F42B 5/045 102/430 |
| H1150 | H * | 3/1993 | Fritch | F42B 8/12 102/293 |
| 5,872,324 | A * | 2/1999 | Watson, Jr. | F42C 9/142 102/247 |
| 8,408,139 | B2 * | 4/2013 | Baumann | F42B 12/207 102/491 |
| 8,826,822 | B1 * | 9/2014 | Huang | F42B 15/00 102/347 |
| 9,024,238 | B1 * | 5/2015 | Stofko | F42B 30/10 244/3.24 |
| 9,194,675 | B1 * | 11/2015 | Manole | F42B 14/02 |
| 9,500,454 | B1 * | 11/2016 | Decker | F42B 10/56 |
| 2003/0079464 | A1 * | 5/2003 | Solberg | F02K 9/38 60/223 |
| 2005/0082419 | A1 * | 4/2005 | Dryer | F42B 30/12 244/3.3 |
| 2005/0263029 | A1 * | 12/2005 | Kumar | F42B 5/02 102/498 |
| 2012/0210898 | A1 * | 8/2012 | Ritchie | F42C 1/04 102/226 |
| 2016/0018199 | A1 * | 1/2016 | Nemec | F42B 5/02 102/439 |

* cited by examiner

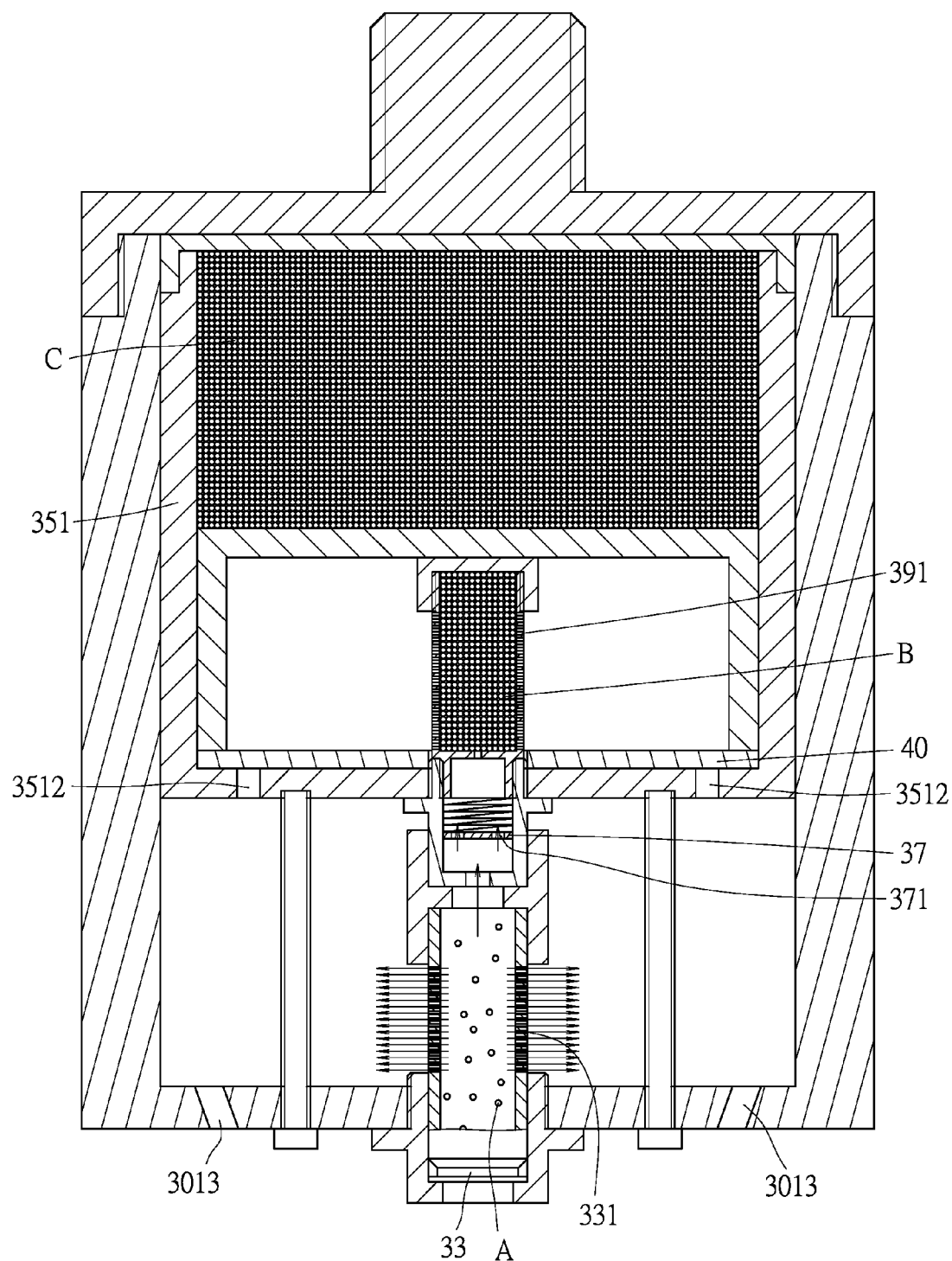
F I G . 6

ROCKET STRUCTURE

BACKGROUND OF THE INVENTION

1. Technical Field

The present invention relates to a rocket structure and more particularly to the structure of a rocket which features two-stage combustion, which has no backblast when fired, and which can be propelled spirally in the absence of rifling grooves in the launcher tube.

2. Description of Related Art

Most rockets are configured for propulsion by one-stage combustion, which causes backblast upon firing because the gunpowder in the rocket casing burns rapidly. In addition, the warhead of such a rocket has load limitations in order to reach a certain range, which cannot be reached if the warhead is overloaded.

Besides, rifling grooves are typically required in a rocket launcher tube. The grooves help spin a rocket so that the rocket is propelled in a spiral manner to cause greater damage. This rifled design, however, increases production costs significantly.

BRIEF SUMMARY OF THE INVENTION

To overcome the aforesaid drawbacks of the prior art, the present invention provides a rocket which is propelled by two-stage combustion, which produces no backblast when fired from a launcher tube, and which spins even if the launcher tube has no rifling grooves.

The present invention includes a warhead, a rocket body, and a rocket motor.

The rocket body is connected to the warhead and is peripherally provided with a plurality of fins, wherein each fin is connected to the rocket body via a torsion spring. The rocket motor is connected to the rocket body.

The rocket motor includes an outer casing, at least one fixing member, a first supporting member, a first bullet, a connecting member, an inner casing, a second supporting member, a metal plate, an elastic member, a second bullet, and a plastic cover.

The bottom of the outer casing has a first coupling hole and at least one fixing hole. The fixing member extends into the outer casing through the fixing hole. The first supporting member has two opposite hollow ends, extends into the first coupling hole, and is coupled to the outer casing. The first bullet is placed on the first supporting member from inside the outer casing and is supported by the first supporting member. The connecting member has two opposite hollow ends and includes a first connecting portion and a second connecting portion, which are respectively located at the two opposite ends of the connecting member. The connecting member is connected to the first bullet via the first connecting portion. The inner casing has a bottom with a second coupling hole, is placed in the outer casing, and is fixed on the fixing member. The second supporting member has two opposite hollow ends, one of which extends into the second coupling hole and is coupled to the inner casing while the other of which is connected to the second connecting portion of the connecting member. The second supporting member further has a shielding portion. The metal plate has at least one through hole and is placed in the second supporting member such that the through hole is shielded by the shielding portion. The elastic member is placed in the second supporting member and is located on the metal plate. The second bullet is placed on the second supporting member from inside the inner casing and abuts against the elastic member. The plastic cover lies atop the second bullet, covers the second bullet, and divides the interior of the inner casing in such a way that a gunpowder chamber is formed within the inner casing.

Preferably, the outer casing includes an outer casing body and a cap. The cap lies atop the outer casing body and covers the outer casing body.

Preferably, the inner casing includes an inner casing body and a lid. The lid lies atop the inner casing body and covers the inner casing body.

Preferably, the bottom of the outer casing has a plurality of propulsion-gas outlet holes which are each inclined at 20 degrees.

Preferably, the bottom of the inner casing has a plurality of vertical vent holes.

Preferably, the first bullet is peripherally provided with a plurality of first air holes, and a plastic tube with first gunpowder received therein is placed in the first bullet.

Preferably, the second bullet, in which second gunpowder is placed, is peripherally provided with a plurality of second air holes and has a bottom with a through bore in communication with the second supporting member. The second air holes and the through bore are smaller than particles of the second gunpowder.

The present invention has the following advantageous effects:

1. The inclined propulsion-gas outlet holes in the bottom of the outer casing enable the rocket of the present invention to be propelled spirally when fired, even if there is no rifling in the launcher tube.

2. Configured to be propelled by two-stage combustion, the rocket of the present invention can carry a heavier warhead and has a greater range than a rocket configured for one-stage combustion. In addition, there is no backblast when the rocket is fired from the launcher tube.

BRIEF DESCRIPTION OF THE SEVERAL VIEWS OF THE DRAWINGS

FIG. 6 shows how the metal plate in the present invention rises due to gas pressure generated by combustion of the first gunpowder, and how the hot gas flows through the through hole as a result and ignites the second gunpowder.

DETAILED DESCRIPTION OF THE INVENTION

The foregoing technical features are incorporated into a rocket structure whose major effects are detailed below with reference to the following embodiment.

Figure 1:
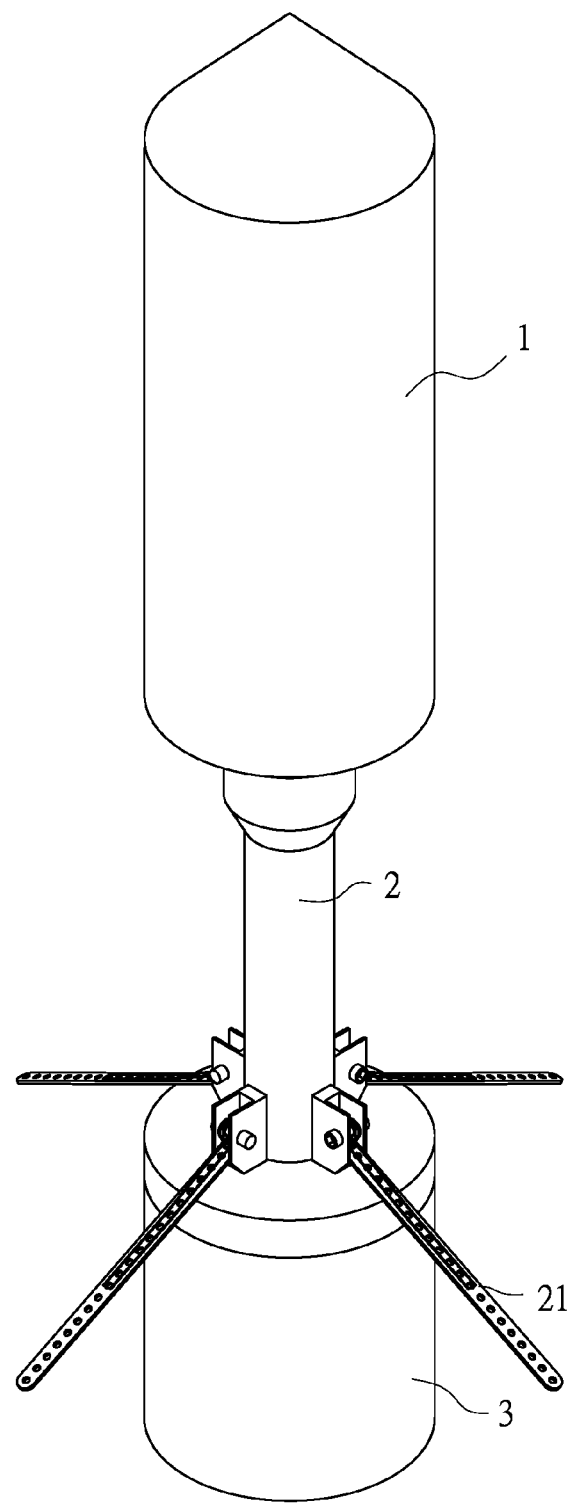
FIG. 1 is a perspective view of the rocket of the present invention.

Referring to FIG. 1, an embodiment of the present invention includes a warhead 1, a rocket body 2, and a rocket motor 3. The rocket body 2 is connected to the warhead 1 and is peripherally provided with a plurality of fins 21. The rocket motor 3 is connected to the rocket body 2. For instance, the warhead 1, the rocket body 2, and the rocket motor 3 can be connected together threadedly.

Figure 2:
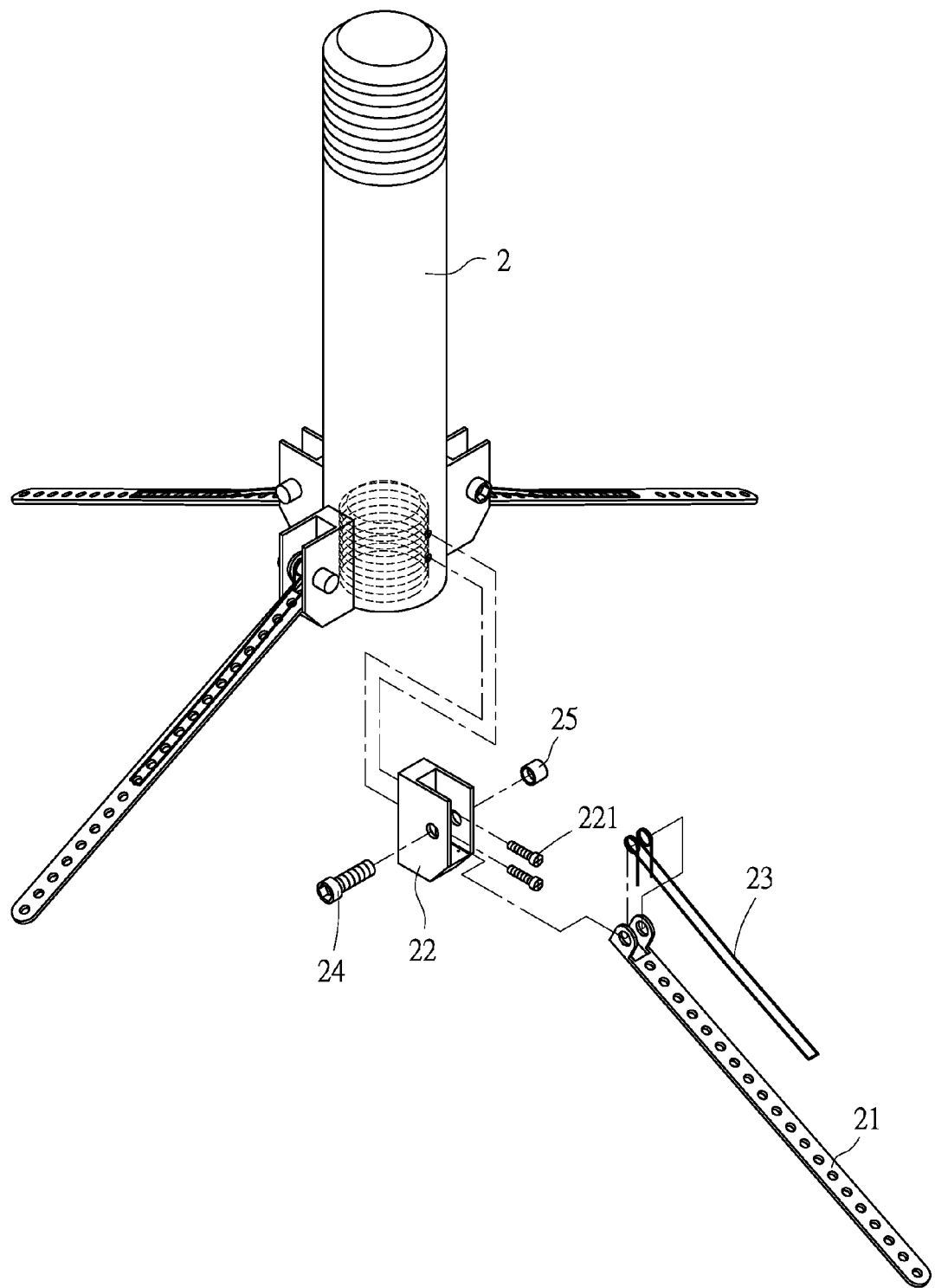
FIG. 2 is an exploded perspective view of the rocket body in the present invention.

To facilitate manufacture, particularly unmolding, the rocket body 2 is attached with a plurality of bases 22, as shown in FIG. 2. The bases 22 can be fastened to the rocket body 2 by screws 221 for example. Each fin 21 is connected to one base 22 via a torsion spring 23 and then fastened to the base 22 by a bolt 24 and a nut 25.

Figure 3:
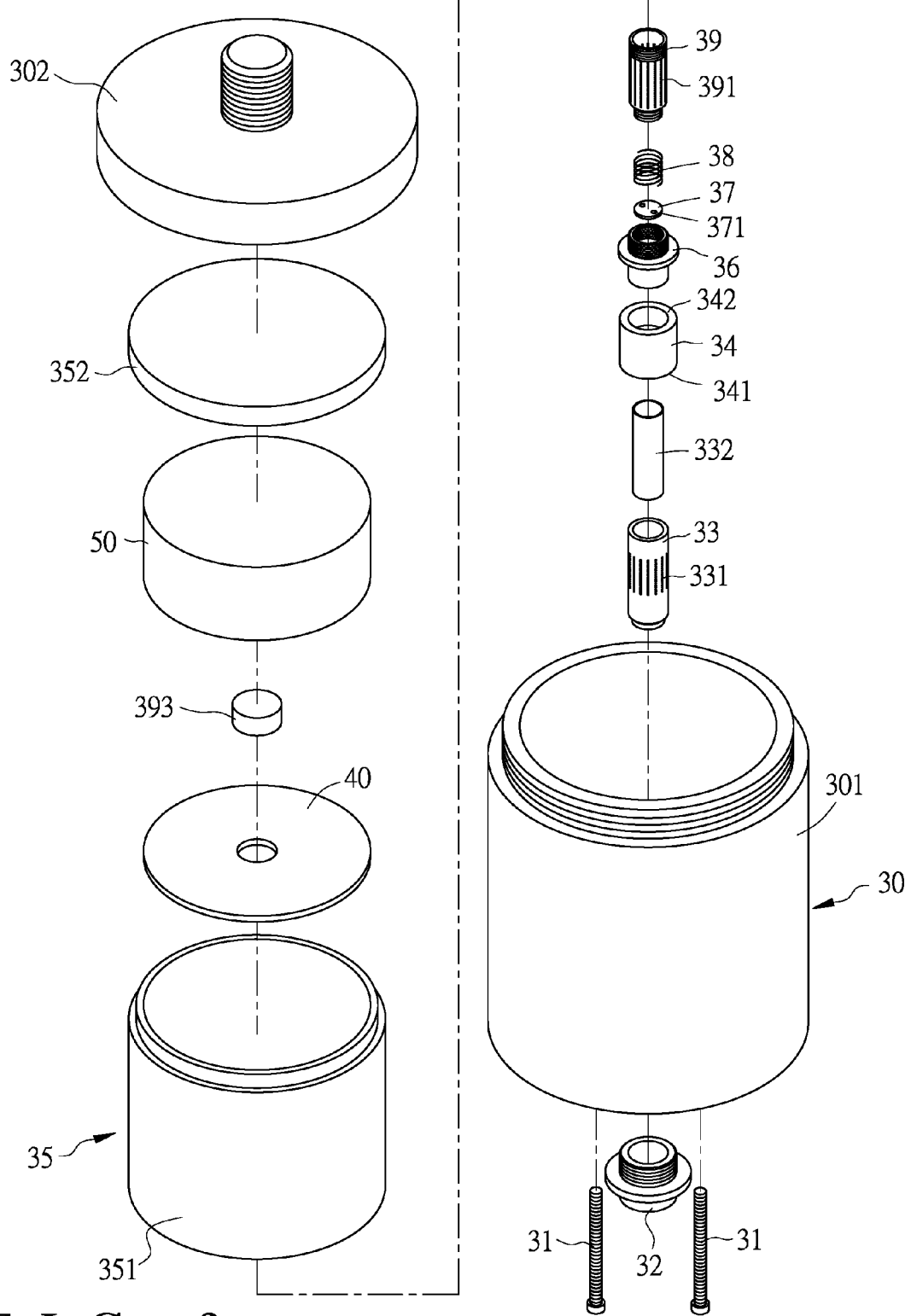
FIG. 3 is an exploded perspective view of the rocket motor in the present invention.
Figure 4:
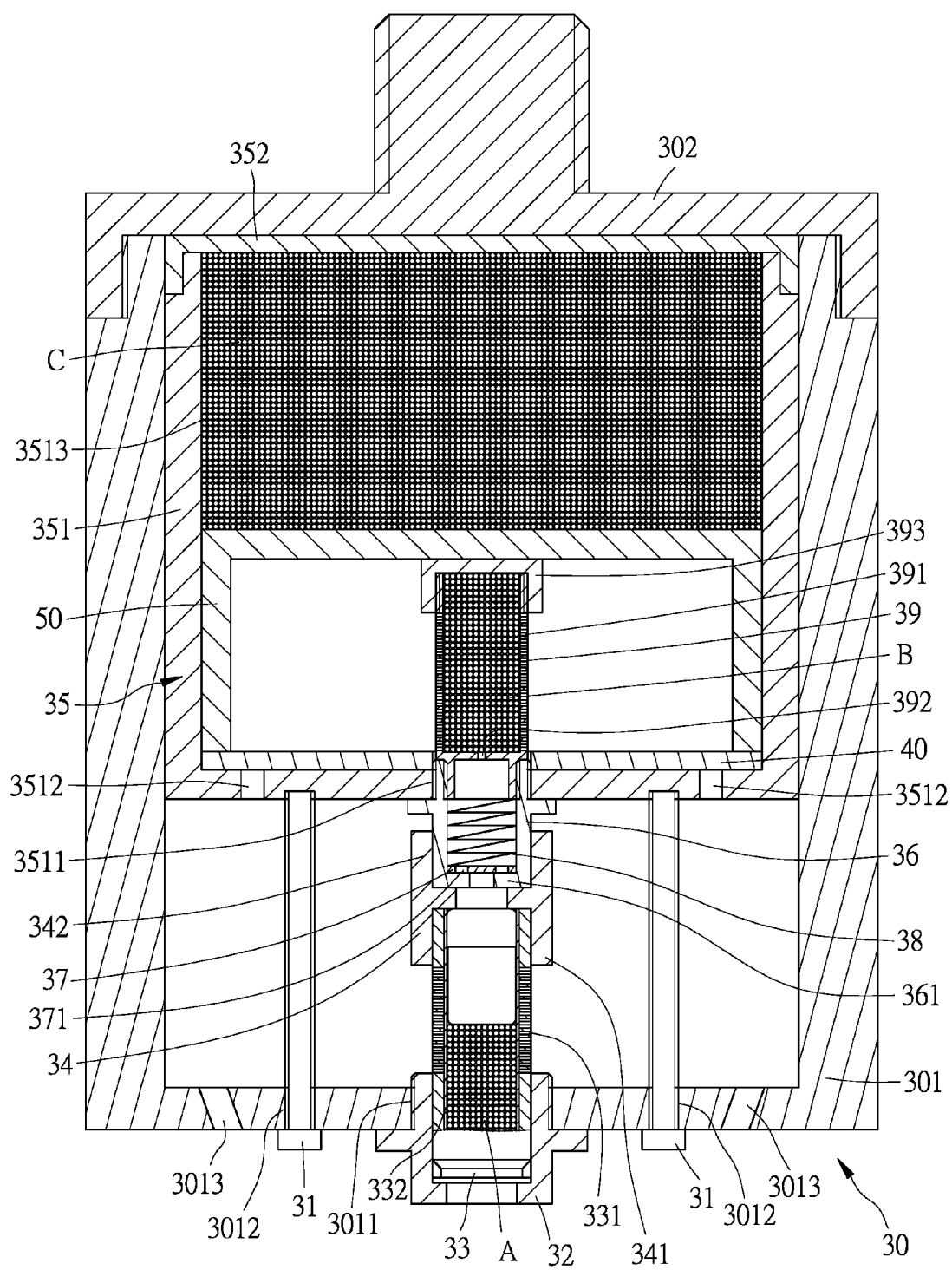
FIG. 4 is a sectional view of the rocket motor in the present invention.

Referring to FIG. 3 and FIG. 4, the rocket motor 3 includes an outer casing 30, at least one fixing member 31, a first supporting member 32, a first bullet 33, a connecting member 34, an inner casing 35, a second supporting member 36, a metal plate 37, an elastic member 38, a second bullet 39, a plastic pad 40, and a plastic cover 50.

The outer casing 30 has an outer casing body 301 and a cap 302 lying atop, and covering, the outer casing body 301. The bottom of the outer casing body 301 has a first coupling hole 3011, at least one fixing hole 3012, and a plurality of propulsion-gas outlet holes 3013 each inclined at 20 degrees. The fixing member 31 extends into the outer casing body 301 through the fixing hole 3012. The first supporting member 32 has two opposite hollow ends, extends into the first coupling hole 3011, and is coupled to the outer casing body 301. The first bullet 33 is placed on the first supporting member 32 from inside the outer casing body 301 and is supported by the first supporting member 32. The first bullet 33 is peripherally provided with a plurality of first air holes 331. A plastic tube 332 is placed in the first bullet 33 and serves to receive first gunpowder A. The first gunpowder A includes a plurality of gunpowder particles and a gunpowder capsule. The connecting member 34 has two opposite hollow ends, which are respectively provided with a first connecting portion 341 and a second connecting portion 342. The connecting member 34 is connected to the first bullet 33 via the first connecting portion 341 such that the gunpowder capsule corresponds to and closes the opening of the first connecting portion 341 to prevent the gunpowder particles from falling into the connecting member 34. The inner casing 35 is placed in the outer casing body 301 and is fixed on the fixing member 31. The inner casing 35 includes an inner casing body 351 and a lid 352 lying atop, and covering, the inner casing body 351. The bottom of the inner casing body 351 has a second coupling hole 3511 and a plurality of vertical vent holes 3512. The second supporting member 36 has two opposite hollow ends. One of the two ends of the second supporting member 36 extends into the second coupling hole 3511 and is coupled to the inner casing body 351, while the other end of the second supporting member 36 is connected to the second connecting portion 342 of the connecting member 34. The second supporting member 36 further has a shielding portion 361. The metal plate 37 has at least one through hole 371 and is placed in the second supporting member 36 such that the through hole 371 is shielded by the shielding portion 361. The elastic member 38 is placed in the second supporting member 36 and is located on the metal plate 37 to fix the metal plate 37 in position. The second bullet 39 is placed on the second supporting member 36 from inside the inner casing body 351 and abuts against the elastic member 38. The second bullet 39 is peripherally provided with a plurality of second air holes 391, and the bottom of the second bullet 39 has a through bore 392 in communication with the second supporting member 36. The second air holes 391 and the through bore 392 are smaller than particles of the second gunpowder B received in the second bullet 39 so that the second gunpowder B will not leak through the second air holes 391 or the through bore 392. A covering 393 lies atop, and covers, the second bullet 39. The plastic pad 40 is mounted around the second bullet 39 and lies on the inner bottom surface of the inner casing body 351. The plastic cover 50 lies atop, and covers, the second bullet 39 and divides the interior of the inner casing body 351 in such a way that a gunpowder chamber 3513 is formed within the inner casing body 351. Third gunpowder C is placed in the gunpowder chamber 3513.

Figure 5:
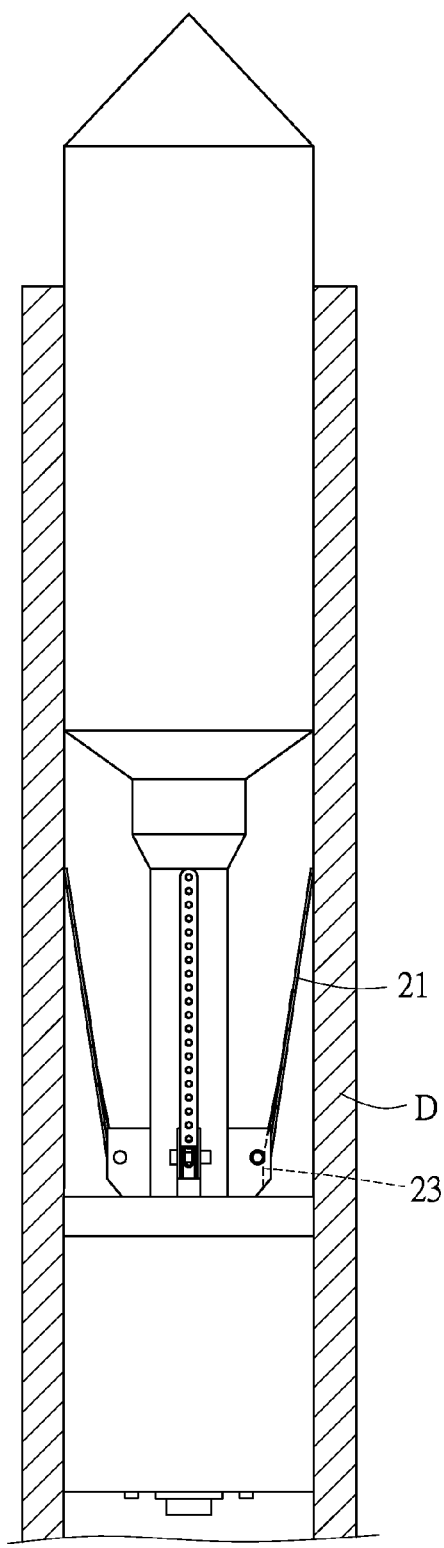
FIG. 5 shows the rocket of the present invention in a launcher tube.

Referring to FIG. 5, in order to put the rocket of the present invention into a launcher tube D, the fins 21 must be pivoted to a folded position. While the rocket is inserted into the launcher tube D, the torsion springs 23 store elastic potential energy. Once the rocket is fired from inside the launcher tube D, the fins 21 are no more restrained by the tube body of the launcher tube D. The torsion springs 23 release the stored elastic potential energy to pivot the fins 21 open, as shown in FIG. 1.

The rocket of the present invention is fired in the following manner. To begin with, referring to FIG. 6, the first gunpowder A in the first bullet 33 is ignited. The gunpowder particles and the gunpowder capsule of the first gunpowder A burn sequentially, meaning there is a time difference between combustion of the gunpowder particles and that of the gunpowder capsule; consequently, the resulting pressure is relatively low, which leads to a relatively small recoil force. After the plastic tube 332 is burned out, the gas in the tube expands due to combustion and is discharged through the first air holes 331 of the first bullet 33 and the propulsion-gas outlet holes 3013 in the outer casing body 301, thereby propelling the rocket from inside the launcher tube D. The process described above is the first stage of combustion. Since only the first gunpowder A burns in this stage of combustion, no backblast is produced at the rear of the launcher tube D.

Once the rocket is propelled out of the launcher tube D, the high-temperature expanding gas lifts the metal plate 37 such that the through hole 371 in the metal plate 37 is no longer shielded by the shielding portion 361 of the second supporting member 36. The high-temperature expanding gas enters the second bullet 39 through the through hole 371 and ignites the second gunpowder B in the second bullet 39. The rocket at this moment has flown for about 15 meters away from the launcher tube D. During combustion of the second gunpowder B, high-temperature gas is discharged through the second air holes 391 of the second bullet 39, thereby burning out the plastic cover 50 and igniting the relatively large amount of third gunpowder C in the gunpowder chamber 3513. As the third gunpowder C burns, the resulting high-temperature high-pressure gas bursts out of the plastic pad 40 and is discharged through the vertical vent holes 3512 in the inner casing body 315 and the propulsion-gas outlet holes 3013 in the outer casing body 301 to accelerate the rocket, and this concludes the second stage of combustion.

As each propulsion-gas outlet hole 3013 in the outer casing body 301 tilts at 20 degrees, the high-temperature high-pressure gas discharged through the propulsion-gas outlet holes 3013 is driven out slantingly and thus rotates the rocket. The rocket, therefore, is propelled in a spiral manner. That is to say, even if the launcher tube D has no rifling grooves, the rocket of the present invention can be propelled spirally.

The description of the foregoing embodiment should be able to enable a person skilled in the art to fully understand the operation, use, and effects of the present invention. The embodiment, however, is but a preferred one of the invention and is not intended to be restrictive of the scope of the invention. All simple, equivalent changes and modifications based on the appended claims and the disclosure of this specification should fall within the scope of the present invention.

What is claimed is:

1. A rocket structure, comprising:
   a warhead;
   a rocket body connected to the warhead, the rocket body being peripherally provided with a plurality of fins, each said fin being connected to the rocket body via a torsion spring;
   a rocket motor connected to the rocket body, the rocket motor comprising:
   an outer casing, a bottom of which has a first coupling hole and at least one fixing hole;
   at least one fixing member extending into the outer casing through the fixing hole;
   a first supporting member having two opposite hollow ends, extending into the first coupling hole, and coupled to the outer casing;
   a first bullet placed on the first supporting member from inside the outer casing and supported by the first supporting member;
   a connecting member having two opposite hollow ends, which are respectively provided with a first connecting portion and a second connecting portion, the connecting member being connected to the first bullet via the first connecting portion;
   an inner casing, a bottom of which has a second coupling hole, the inner casing being placed in the outer casing and fixed on the fixing member;
   a second supporting member having two opposite hollow ends, wherein one said end of the second supporting member extends into the second coupling hole and is coupled to the inner casing, and the other end of the second supporting member is connected to the second connecting portion of the connecting member, the second supporting member further having a shielding portion;
   a metal plate having at least one through hole, the metal plate being placed in the second supporting member such that the through hole is shielded by the shielding portion;
   an elastic member placed in the second supporting member and located on the metal plate;
   a second bullet placed on the second supporting member from inside the inner casing and abutting against the elastic member; and
   a plastic cover lying atop, and covering, the second bullet such that an interior of the inner casing is divided to form a gunpowder chamber.

2. The rocket structure of claim 1, wherein the outer casing comprises an outer casing body and a cap lying atop, and covering, the outer casing body.

3. The rocket structure of claim 2, wherein the inner casing comprises an inner casing body and a lid lying atop, and covering, the inner casing body.

4. The rocket structure of claim 1, wherein the bottom of the outer casing has a plurality of inclined propulsion-gas outlet holes.

5. The rocket structure of claim 4, wherein the propulsion-gas outlet holes in the bottom of the outer casing are each inclined at 20 degrees.

6. The rocket structure of claim 1, wherein the bottom of the inner casing has a plurality of vertical vent holes.

7. The rocket structure of claim 1, wherein the first bullet is peripherally provided with a plurality of first air holes, and a plastic tube with first gunpowder received therein is placed in the first bullet.

8. The rocket structure of claim 1, wherein the second bullet has second gunpowder placed therein, is peripherally provided with a plurality of second air holes, and has a bottom with a through bore in communication with the second supporting member, and the second air holes and the through bore are smaller than particles of the second gunpowder.

* * * * *